Dec. 13, 1960  R. J. SARGENT  2,964,060
SELECTOR CONTROL
Filed Jan. 9, 1957
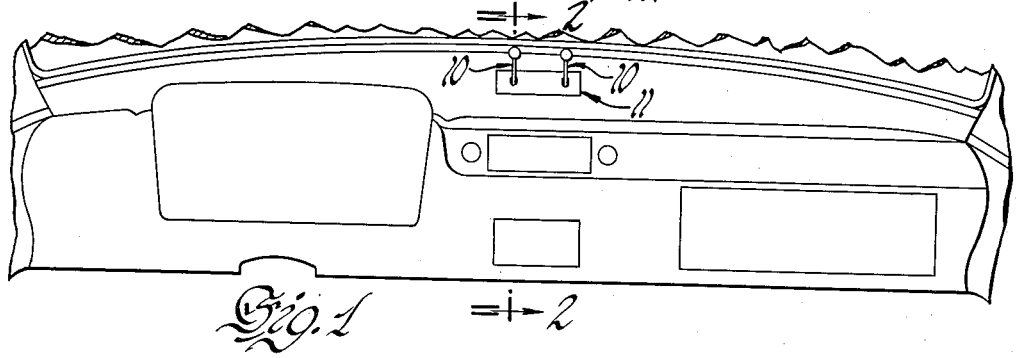
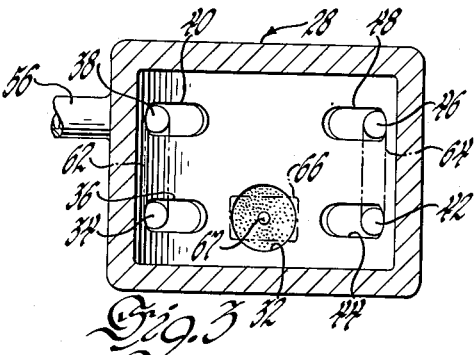
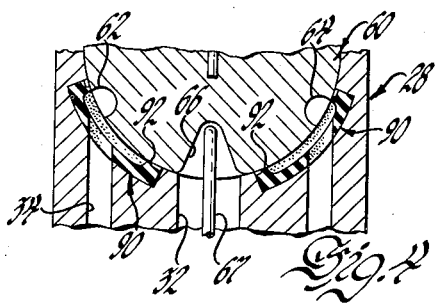
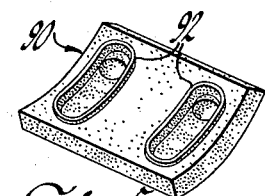
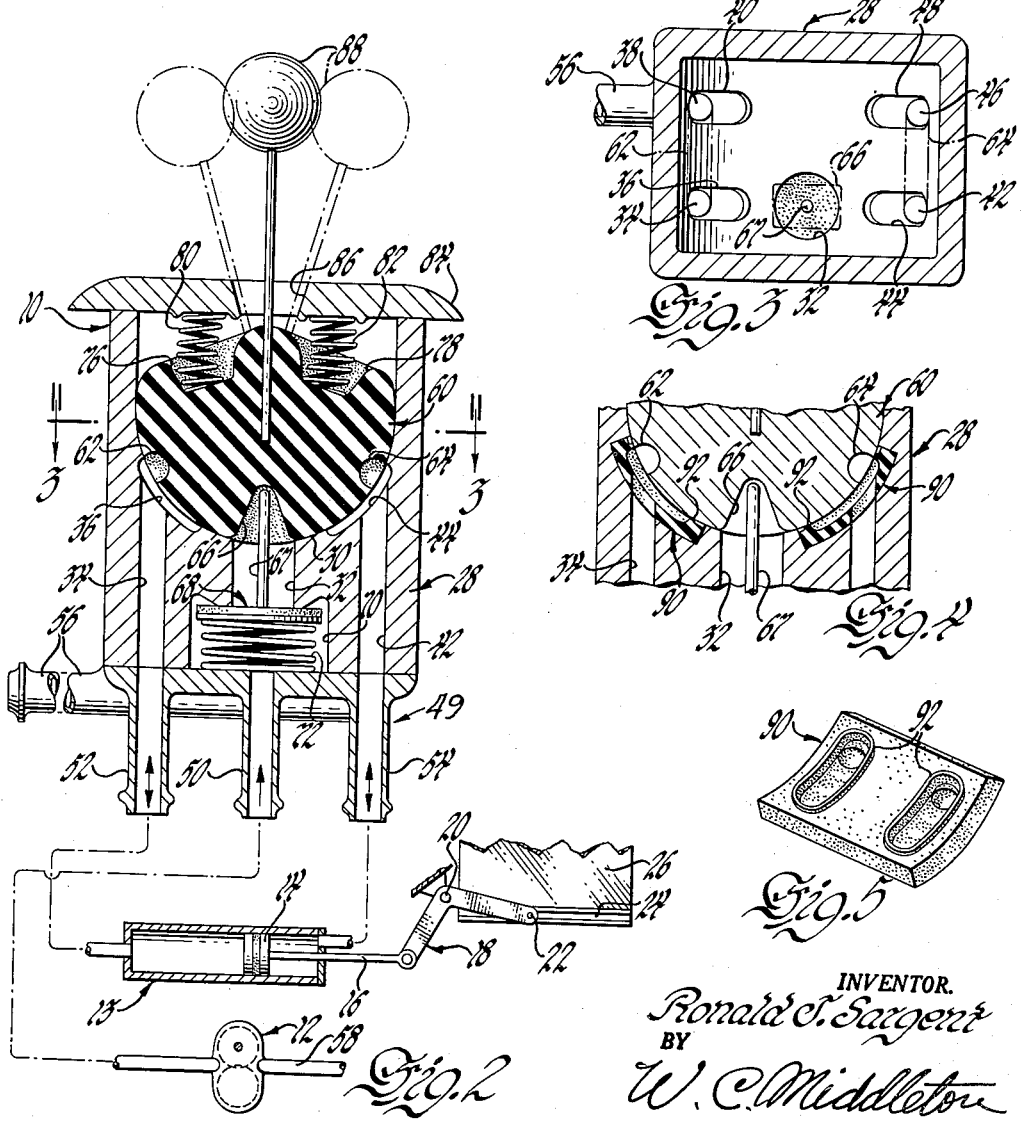
INVENTOR.
Ronald J. Sargent
BY
W. C. Middleton
ATTORNEY.

2,964,060
SELECTOR CONTROL

Ronald J. Sargent, Clio, Mich., assignor to General Motors Corporation, Detroit, Mich., a corporation of Delaware Filed Jan. 9, 1957, Ser. No. 633,333

13 Claims. (Cl. 137—624)

This invention relates to improvements in selector controls and particularly to multi-position selector valves for controlling pressure operated servomotors.

In systems with pressure operated servomotors, e.g., motor vehicle window systems, there are many special requirements of the controls. To lessen the number of controls, each should combine several functions and accomplish them efficiently. Such a control must be simply constructed to facilitate manufacture and subsequent repair. The control must be easily operated and transfer pressures from one passage to another without leakage and with proper overlaps being established, for instance, the opening of an exhaust passage must not occur so that for an instant the pressure source is exhausted. Leakages must be kept to a minimum during periods of operation as well as when the control is at rest.

With these considerations in mind, this invention provides a selector control which effectively correlates several functions. When combined with an associated device, such as a servomotor, a single control accomplishes all of the normal functions. The invention also provides that during certain periods the control returns to a position in which pressure from a source aids in preventing leakage of the source pressure.

In carrying out the invention a valve rotor is movably positioned in a valve casing having multiple passages. The valve rotor is maneuverable from a neutral or normal position to an operative position in which pressure from a source is directed from an inlet passage through the casing to an outlet passage. When released, the valve rotor returns to the normal position cutting off the pressure source and opening an outlet passage to an exhaust passage. The inlet passage with the valve rotor in the normal position is positively sealed and closed by pressure from the source, hence, preventing leakage of pressure within the casing. When this selector control is combined with a servomotor, the selector control interconnects the pressure source with the motor so that in one operative position the piston of the servo is moved in one direction and in another position it is moved in the opposite direction.

The foregoing and other objects and advantages will be more apparent from the following description and from the accompanying drawings in which:

Figure 1 is a fragmentary view of a motor vehicle instrument panel with the present invention installed thereon.

Figure 2 is a sectional view of a selector control according to the invention combined with a window system shown schematically.

Figure 3 is a view along the lines 3—3 of Figure 2 of the valve seat surface.

Figure 4 is a fragmentary sectional view similar to Figure 2 of a modification.

Figure 5 is a perspective view of a sealing member used in the Figure 4 modification.

Referring to Figures 1 and 2, a selector control 10 according to the invention is illustrated in a motor vehicle window system and is installed for operator accessibility on a motor vehicle instrument panel 11. The selector control has other uses and, of course, may be employed in other type systems which utilize any fluid pressure, e.g., liquid or air. In the Figure 2 window system, pressure fluid from a suitable source, such as pump 12, is supplied through selector control 10 to servomotor 13. Servomotor 13 includes a piston 14 with an attached piston rod 16 which rod is linked to one end of a bell crank lever 18. The bell crank lever 18 is pivotally mounted at 20 and has a pin 22 at the end opposite the piston rod connection which pin 22 rides in a guide slot 24 provided along a window 26. When pressure fluid acts on either end of the piston 14 the window 26 is raised or lowered by the bell crank lever 18.

The selector control 10 has a valve casing 28 with a substantially diametrical concave valve seating surface 30 and which as depicted in Figure 3 may be of rectangular shape in cross section. Casing 28 has an inlet passage 32 approximately intermediate a first set of passages including an outlet passage 34 which opens into an inwardly extending depressed ramp 36 along the surface 30 and an exhaust passage 38 which opens into a ramp 40 similar to the ramp 36. On the opposite side from this first set of passages there is a second set of passages including outlet passage 42 which opens into a ramp 44 and an exhaust passage 46 which opens into a ramp 48 both of these ramps 44 and 48 being like ramp 36.

At the bottom of the casing 28, a connecting plate 49 is suitably secured thereto and has a series of tubular extensions 50, 52 and 54 depending therefrom. The tubular extension 50 is aligned with and interconnects the inlet passage 32 with the pump 12, the tubular extension 52 is aligned with a service or outlet passage 34 and is interconnected with the left end of the servomotor 13, and the tubular extension 54 is aligned with a service or outlet passage 42 and is interconnected with the opposite end of the servomotor 13. A tubular extension 56 extending transversely of the extensions 50, 52 and 54 communicates with both of the exhaust passages 38 and 46 and is connected to a sump (not shown) to which the suction conduit 58 of the pump is also connected.

Angularly adjustable and slidable along the sealing surface 30 is a valve rotor 60. This valve rotor conforms to the configuration of the seating surface 30 and has a width equivalent to that provided by the casing. Preferably, in the Figure 2 embodiment the valve rotor 60 is made of mechanical rubber or some other equivalent material. Oppositely disposed cross channels 62 and 64 are provided along the peripheral surface of the rotor 60 and in the position demonstrated provide communication, respectively, between outlet passage 34 and exhaust passage 38 and outlet 42 and exhaust passage 46. Intermediate these cross channels 62 and 64, an inlet channel or conical recess 66 is provided which overlays the inlet passage 32 as depicted in Figure 3 and which receives a stem 67 on an inlet valve 68. The valve 68 is positioned within a bore 70 in casing 28 and is biased to the seating or closed position relative to inlet passage 32 by a spring 72. In this closed position, pressure fluid from the pump 12 cannot proceed into inlet passage 32 and aids the spring 72 in maintaining the inlet valve 68 tightly closed preventing leakage. When the valve rotor 60 is rotated, a wall of the recess 66 engages the stem 67 and tilts or cocks valve 68 in opposition to the spring 72 allowing pressure fluid from the pump 12 to proceed to the inlet passage 32.

The upper end of the valve rotor 60 has depressions 76 and 78 which, respectively, provide seats for restoring springs 80 and 82. Springs 80 and 82 are compressed when a cover plate 84 is secured on the casing 28 and urge the rotor 60 to the neutral or normal Figure 2 position as well as help in providing a sealing relationship of the rotor 60 with the seating surface 30. The cover plate 84 has a tapered slot 86 for limiting angular movement in each direction of a handle 88 which is affixed or otherwise secured to the valve rotor 60.

In a modification of the Figure 2 embodiment as demonstrated in Figures 4 and 5, ramps 36 and and 40 on one side and ramps 44 and 48 on the other side are adapted to accommodate sealing members 90 which are of a suitable resilient material as rubber. Two openings are provided in each of these sealing members 90 which correspond when installed in the casing to the exhaust and outlet passages on each side of the casing 28. These openings are surrounded by a lip 92 of substantially the same configuration as the ramps 36, 38, 44 and 48. With these sealing members 90 installed, the rotor 60 can be made of a metallic material, for instance, diecast aluminum and the fit need not be as accurate to maintain a sealing relation as that in the Figure 1 embodiment. Consequently, because of the sealing effect of the lips 92, manufacturing tolerances would not have to be as closely observed.

In operation, the selector control 10 has three settings. One, a normal or neutral position, illustrated in Figure 2 with the handle 88 in the solid line position, in which the inlet valve 68 is closed, the outlet passage 36 is open to the exhaust passage 38 through the cross channel 62 and the outlet passage 42 communicates with exhaust passage 46 through the cross channel 64 in the rotor 60. As a result, in neutral both ends of the servomotor 13 are relieved of pressure fluid. When the handle 88 is moved to the left to a second setting represented by the left hand dotted line position, the extent of movement being determined by the tapered slot 86, cross channel 64, moves beyond the passages 44 and 48 and the recess 66 causes the inlet valve 68 to be tilted admitting pressure fluid to the inlet passage 32. This pressure fluid then may proceed from the recess 66 along the ramp 44 through the outlet passage 42 to the right end of the servomotor and move the piston 14 so as to lower or move the window 26 downwardly. Because of the extension of the ramps 36 and 38 the opposite cross channel 62 will still permit communication between the outlet passage 34 and exhaust passage 38, hence, continuing to drain the left end of the servomotor. When the handle 88 is released, the restoring springs 80 and 82 return the valve rotor 60 to the aforementioned neutral or normal position, at which time the opposite ends of the servomotor 13 are relieved to the exhaust passages 38 and 48. Next, when the valve rotor 60 is moved to a third setting in the opposite direction with the handle 88 in the right hand dotted line position against the tapered slot 86, the cross channel 62 will move out of communication with the passage 34 and 38. The recess 66 will tilt the inlet valve 68 so that pressure fluid is supplied from the pump 12 through inlet passage 32, the recess 66, and due to the overlap of the recess 66 with the ramp 36 supply pressure fluid through the outlet passage 34 to the left end of the servomotor. The pressure fluid will then move the piston 14 to the right moving the window 26 upwardly. Again, upon release of the handle 88, it will return the valve rotor 60 to the neutral position.

It should be noted that by the arrangement of the recess 66 and the cross channels 62 and 64 in the rotor 60 and the inlet passage 32, the exhaust passages 38 and 48 and the outlet passages 34 and 42 in the valve casing 28, communication between the outlet and exhaust passages through the cross channels is interrupted before the recess 66 opens the outlet passage to the inlet passage in movement of the rotor 60 to one of the operative positions. This feature insures that the pressure from the source is not for an instant bled or relieved to exhaust. Furthermore, with pressure from the source holding the inlet valve 68 closed leakage cannot occur around the valve rotor seating surface 30.

Although the selector control 10 is demonstrated for use with super-atmospheric pressure, it is obvious that with minor changes sub-atmospheric pressure may be used. For example, the inlet valve 68 would be biased downwardly and the bottom of the valve would become the sealing surface.

I claim:

1. A control valve assembly comprising, in combination, a casing including a valve seat therein and having opening into said valve seat, spaced inlet, service and exhaust passages, a valve rotor movable on said valve seat between neutral and operative positions, said valve rotor being arranged in the operative position to establish communication between said inlet and service passages and to interrupt communication between said service and exhaust passages and in the neutral position to establish communication between said service and exhaust passages and to interrupt communication between said inlet and service passages, and a resilient sealing member positioned in said valve seat and having extending therefrom deflectable lip portions defining both said service passage and said exhaust passages and arranged so as to have wiping engagement with said valve rotor during movement thereof thereby providing a sealing engagement therewith.

2. A control valve assembly for controlling pressure from a source comprising, in combination, a casing including a valve seat therein and having opening into said valve seat, spaced inlet, service and exhaust passages, the inlet passage being connected to the pressure source, a valve rotor having formed along a portion of the periphery thereof an arcuate surface arranged so as to engage said valve seat during movement of said valve rotor between neutral and operative positions, said valve rotor being arranged in the operative position to establish communication between said inlet and service passages and to interrupt communication between said service and exhaust passages and in the neutral position to establish communication between said service and exhaust passages and to interrupt communication between said inlet and service passages, and an inlet valve disposed in said inlet passage and including a stem portion engageable by said valve rotor, said inlet valve being tiltable by the coaction between said stem portion and said valve rotor when said valve rotor is moved to the operative position thereof to open said inlet passage, the inlet valve being maintained closed by pressure from the source when the valve rotor is in the neutral position.

3. A control valve assembly comprising, in combination, a casing including a valve seat therein and having opening into said valve seat, spaced inlet, service and exhaust passages, said valve seat having recessed ramps extending from both said service and exhaust passages towards said inlet passage, a valve rotor having the periphery thereof formed with an arcuate portion arranged so as to engage said valve seat and an oppositely disposed relieved portion arranged so as to be free of engagement with said casing, said valve rotor being movable thereon to an operative position from a normal position, said valve rotor having along said arcuate portion a channel for interconnecting said exhaust and service passages in said normal position thereof and an inlet channel for interconnecting said inlet passage and said service passage in the operative position thereof.

4. A control valve assembly comprising, in combination, a casing including a concave valve seat therein and having opening into said valve seat, spaced inlet, service and exhaust passages, a valve rotor having formed along a portion of the periphery thereof an arcuate surface arranged so as to engage said valve seat, said valve rotor being angularly adjustable on said valve seat to an operative position from a normal position, said valve rotor having along said arcuate surface a channel for interconnecting said exhaust and service passages in said normal position thereof and an inlet channel for interconnecting said inlet passage and said service passage in the operative position thereof, and a resilient sealing member positioned in said valve seat and having extending therefrom deflectable lip portions defining both said exhaust passage and said service passage, said lip portions being arranged so as to have wiping engagement with said arcuate surface on said valve rotor during movement thereof thereby providing a sealing engagement therewith.

5. A control valve assembly comprising, in combination, a casing including a valve seat therein and having opening into said valve seat, spaced inlet, service and exhaust passages, said valve seat having recessed ramps extending from both said service and exhaust passages towards said inlet passage, a valve rotor having the periphery thereof formed with an arcuate portion arranged so as to engage said valve seat and an oppositely disposed relieved portion arranged so as to be free of engagement with said valve seat, said valve rotor being revolvable on said valve seat to an operative position from a normal position, said valve rotor having along said arcuate portion a channel for interconnecting said exhaust and service passages in said normal position thereof and an inlet channel for interconnecting said inlet passage and said service passage in the operative position thereof, biasing means interposed between said casing and said valve rotor relieved portion for restoring said valve rotor to said normal position, an inlet valve disposed in said inlet passage and having an end thereof extending into said valve rotor inlet channel so as to be tiltable by said valve rotor when moved to the operative position thereof from a closed position interrupting communication between said inlet passage and said valve seat to an open position permitting communication between said inlet passage and said valve seat, and means for biasing said inlet valve closed when the valve rotor is in the normal position.

6. A control valve assembly comprising, in combination, a casing including a valve seat therein and having opening into said valve seat, spaced inlet, service and exhaust passages, a valve rotor having the periphery thereof formed with an arcuate portion arranged so as to engage said valve seat and an oppositely disposed relieved portion arranged so as to be free of engagement with said casing, said rotor being movable on said valve seat to an operative position from a normal position, said valve rotor having along said engaging surface, a channel for interconnecting said exhaust and service passages in said normal position thereof, an inlet channel for interconnecting said inlet passage and said service passage in the operative position thereof, biasing means interposed between said casing and said valve rotor relieved portion for restoring said valve rotor to said normal position, an inlet valve disposed in said inlet passage and including a stem engageable by said valve rotor, said inlet valve being tiltable from a closed position interrupting communication between said inlet passage and said valve seat to an open position permitting communication between said inlet passage and said valve seat by said valve rotor when moved to said operative position, means for biasing said inlet valve closed, a handle for manually operating said valve rotor, means coacting between said handle and said casing to limit movement of said valve rotor, and a resilient sealing member positioned in said valve seat and having extending transversely therefrom lip portions defining both said service passage and said exhaust passages, said lip portions being arranged so as to have wiping engagement with said valve rotor arcuate portion during movement of said valve rotor thereby providing a sealing engagement therewith.

7. A selector control comprising, in combination, a casing having a valve seat therein, first and second sets of passages opening into said valve seat, each of said sets including service and exhaust passages, an inlet passage opening into said valve seat between said first and second sets of passages, a valve rotor having formed along a portion of the periphery thereof an arcuate surface engageable with said valve seat so as to cause said valve rotor to be revolvable to first and second operative positions from a normal position, the valve rotor in the normal position establishing communication between said first and second set service and exhaust passage while interrupting communication between said inlet passage and said first and second set service passages, the valve rotor establishing communication between said inlet passage and said first set service passage and interrupting communication between said first set service and exhaust passages while maintaining communication between said second set service and exhaust passages and the valve rotor in the second operative position establishing communication between said inlet passage and said second set service passage and interrupting communication between said second set service and exhaust passages while maintaining communication between said first set service and exhaust passages and resilient sealing members positioned in said valve seat, each of said sealing members having extending transversely therefrom lip portions defining said service and exhaust passages, said lip portions being arranged so as to have wiping engagement with said arcuate surface on said valve rotor during movement thereof thereby providing a sealing engagement therewith.

8. A selector control comprising, in combination, a casing having a valve seat therein, first and second sets of passages opening into said valve seat, each of said sets including service and exhaust passages, an inlet passage opening into said valve seat between said first and second sets of passages, a valve rotor having the periphery thereof formed with an arcuate portion arranged so as to engage said valve seat and an oppositely disposed relieved portion arranged so as to be free of engagement with said casing, said valve rotor being movable on said valve seat to first and second operative positions from a normal position, the valve rotor in the normal position establishing communication between said first and second set service and exhaust passage while interrupting communication between said inlet passage and said first and second set service passages, the valve rotor in the first operative position establishing communication between said inlet passage and said first set service passage and interrupting communication between said first set service and exhaust passages while maintaining communication between said second set service and exhaust passages, and the valve rotor in the second operative position establishing communication between said inlet passage and said second set service passage and interrupting communication between said second set service and exhaust passages while maintaining communication between said first set service and exhaust passages, and biasing means disposed between said valve rotor relieved portion and said casing for restoring said valve rotor to said normal position from one of said operative positions, and an inlet valve disposed in said inlet passage and having a stem portion coacting with said valve rotor so as to cause said inlet valve to be tiltable by said valve rotor from a closed position relative to said inlet passage in the normal position of said valve and to an open position relative to said inlet passage in said first and second operative positions of said valve rotor.

9. A selector control comprising, in combination, a casing having a valve seat therein, first and second sets of passages opening into said valve seat, each of said sets including service and exhaust passages, an inlet passage opening into said valve seat between said first and second sets of passages, a valve rotor having the periphery thereof formed with an arcuate portion arranged so as to engage said valve seat and an oppositely disposed relieved portion arranged so as to be free of engagement with said casing, said valve rotor being movable on said valve seat to first and second operative positions from a normal position, the valve rotor establishing communication between said first and second set service and exhaust passage while interrupting communication between said inlet passage and said first and second set service passages, the valve rotor in the first operative position establishing communication between said inlet passage and said first set service passage and interrupting communication between said first set service and exhaust passages while maintaining communication between said second set service and exhaust passages, and the valve rotor in the second operative position establishing communication between said inlet passage and said second set service passage and interrupting communication between said second set service and exhaust passages while maintaining communication between said first set service and exhaust passages, centering springs disposed between said valve rotor relieved portion and said casing, means for restoring said valve rotor to said normal position, an inlet valve associated with said inlet passage and having a stem portion actuated by said valve rotor so as to cause said inlet valve to close said inlet passage in the normal position of said valve rotor and open said inlet passage in said first and second operative positions of said valve rotor, stop means on the casing limiting movement of said valve rotor, and resilient sealing members positioned in said valve seat, each of said sealing members having extending therefrom lip portions defining said service and exhaust passages, said lip portions being arranged so as to have wiping engagement with said valve rotor arcuate portion during movement of said valve rotor thereby providing a sealing engagement therewith.

10. A selector control comprising, in combination, a casing having a concave valve seat therein, first and second sets of passages opening into said valve seat, each of said sets including service and exhaust passages, an inlet passage opening into said valve seat between said first and second sets of passages, the valve seat having recessed ramps extending from each of said first and second set service and exhaust passages towards said inlet passage, a valve rotor having the periphery formed with an arcuate portion arranged so as to engage said valve seat and an oppositely disposed relieved portion arranged so as to be free of engagement with said valve seat, said valve rotor being angularly adjustable on said valve seat to first and second operative positions from a normal position, said valve rotor having along opposite sides of said engaging surface channels for interconnecting the first and second set exhaust and service passages in said normal position thereof and an intermediate channel for interconnecting said inlet passage and said first set service passage while maintaining communication between said second set service and exhaust passage in the first operative position thereof and for interconnecting said inlet passage and said second set service passage while maintaining communication between said first set service and exhaust passages in the second operative position thereof.

11. A selector control comprising, in combination, a casing having a concave valve seat therein, first and second sets of passages opening into said valve seat, each of said sets including service and exhaust passages, an inlet passage opening into said valve seat between said first and second sets of passages, said valve seat having recessed ramps extending from each of said first and second set service and exhaust passages towards said inlet passage, a valve rotor having the periphery thereof formed with an arcuate portion arranged so as to engage said valve seat and an oppositely disposed relieved portion arranged so as to be free of engagement with said valve seat, said valve rotor being angularly adjustable on said valve seat to first and second operative positions from a normal position, said valve rotor having along opposite sides of said arcuate portion channels for interconnecting the first and second set exhaust and service passages in said normal position thereof and an intermediate channel for interconnecting said inlet passage and said first set service passage while maintaining communication between said second set service and exhaust passage in the first operative position thereof and for interconnecting said inlet passage and said second set service passage while maintaining communication between said first set service and exhaust passages in the second operative position thereof, and resilient sealing members disposed in said ramps, each of said sealing members having extending therefrom lip portions defining said exhaust and service passages, said lip portions being arranged so as to have wiping engagement with said valve rotor arcuate portion during movement of said valve rotor thereby providing a sealing engagement therewith.

12. A selector control comprising, in combination, a casing having a concave valve seat therein, first and second sets of passages opening into said valve seat, each of said sets including service and exhaust passages, an inlet passage opening into said valve seat between said first and second sets of passages, said valve seat having recessed ramps extending from each of said first and second set service and exhaust passages towards said inlet passage, a valve rotor having the periphery thereof formed with an arcuate portion arranged so as to engage said valve seat and an oppositely disposed relieved portion arranged so as to be free of engagement with said casing, said valve rotor being angularly adjustable on said valve seat to first and second operative positions from a normal position, said valve rotor having along opposite sides of said engaging surface channels for interconnecting the first and second set exhaust and service passages in said normal position thereof and an intermediate channel for interconnecting said inlet passage and said first set service passage while maintaining communication between said second set service and exhaust passage in the first operative position thereof and for interconnecting said inlet passage and said second set outlet passage while maintaining communication between said first set service and exhaust passages in the second operative position thereof, biasing means interposed between said casing and said valve rotor relieved portion for restoring said valve rotor to said normal position from one of said operative positions, an inlet valve disposed in said inlet passage and having an end thereof extending into said intermediate valve rotor channel so as to be tiltable by said valve rotor when moved to one of said operative positions from a closed position interrupting communication between said inlet passage and said valve seat to an open position permitting communication between said inlet passage and said valve seat, and means biasing said inlet valve closed when said valve rotor is in the normal position.

13. A selector control comprising, in combination, a casing having a concave valve seat therein, first and second sets of passages opening into said valve seat, each of said sets including service and exhaust passages, an inlet passage opening into said valve seat between said first and second sets of passages, said valve seat having recessed ramps extending from each of said first and second set service and exhaust passages towards said inlet passage, a valve rotor having the periphery thereof formed with an arcuate portion arranged so as to engage said valve seat and an oppositely disposed relieved portion arranged so as to be free of engagement with said casing, the valve rotor being angularly adjustable on said valve seat to first and second operative positions from a normal position, said valve rotor having along opposite sides of said engaging surface channels for interconnecting the first and second set exhaust and service passages in said normal position thereof and an intermediate channel for interconnecting said inlet passage and said first set service passage while maintaining communication between said second set service and exhaust passage in the first operative position thereof and for interconnecting said inlet passage and said second set service passage while maintaining communication between said first set service and exhaust passages in the second operative position thereof, centering springs disposed between said casing and said valve rotor relieved portion for restoring said valve rotor to said normal position from one of said operative positions, an inlet valve disposed in said inlet passage and having a stem portion coacting with said valve rotor so as to cause said inlet valve to be tiltable by said valve rotor when moved to one of said operative positions from a closed position interrupting communication between said inlet passage and said valve seat to an open position permitting communication between said inlet passage and said valve seat, means biasing said inlet valve closed, a handle for manually operating said valve rotor, stop means coacting with said casing and said handle to limit movement of said valve rotor, and resilient sealing members disposed in said ramps, and each of said sealing members having extending transversely therefrom lip portions defining said exhaust and service passages, said lip portions being arranged so as to have wiping engagement with said valve rotor arcuate portion during movement of said valve rotor thereby providing a sealing engagement therewith.

References Cited in the file of this patent

UNITED STATES PATENTS

| | | |
|---|---|---|
| 825,370 | Zurbuch | July 10, 1906 |
| 1,952,034 | Bragg | Mar. 20, 1934 |
| 2,451,706 | Aimes | Nov. 20, 1943 |
| 2,564,444 | Parsons | Aug. 14, 1951 |
| 2,728,353 | Bonham | Dec. 27, 1955 |
| 2,752,945 | Patterson et al. | July 3, 1956 |
| 2,777,426 | Steele | Jan. 15, 1957 |
| 2,806,485 | Collins et al. | Sept. 17, 1957 |
| 2,868,176 | Bennett | Jan. 13, 1959 |

FOREIGN PATENTS

| | | |
|---|---|---|
| 8,274 | Great Britain | Dec. 3, 1915 |